(12) United States Patent
Kanenari

(10) Patent No.: US 9,358,847 B2
(45) Date of Patent: Jun. 7, 2016

(54) APPARATUS FOR TRANSMITTING TIRE INFORMATION AND INCLUDING A COMMUNICATION HOLE PROVIDING COMMUNICATION BETWEEN AN INTERNAL SPACE OF THE APPARATUS AND A TIRE CAVITY, AND TIRE AIR PRESSURE INFORMATION MONITORING SYSTEM USING THE SAME

(75) Inventor: Daisuke Kanenari, Hiratsuka (JP)

(73) Assignee: THE YOKOHAMA RUBBER CO., LTD., Tokyo (JP)

( * ) Notice: Subject to any disclaimer, the term of this patent is extended or adjusted under 35 U.S.C. 154(b) by 281 days.

(21) Appl. No.: 14/233,120

(22) PCT Filed: Jul. 20, 2012

(86) PCT No.: PCT/JP2012/004630
§ 371 (c)(1),
(2), (4) Date: Jan. 15, 2014

(87) PCT Pub. No.: WO2013/011697
PCT Pub. Date: Jan. 24, 2013

(65) Prior Publication Data
US 2014/0159889 A1 Jun. 12, 2014

(30) Foreign Application Priority Data
Jul. 21, 2011 (JP) .................................. 2011-160269

(51) Int. Cl.
*G08B 21/00* (2006.01)
*B60C 23/04* (2006.01)

(52) U.S. Cl.
CPC .................................. *B60C 23/0494* (2013.01)

(58) Field of Classification Search
CPC ............ B60C 23/0494; B60C 23/0408; B60C 23/0452

USPC .......................................................... 340/447
See application file for complete search history.

(56) References Cited

U.S. PATENT DOCUMENTS

| | | | |
|---|---|---|---|
| 7,197,939 B2 | 4/2007 | Sakai et al. | |
| 2005/0172724 A1* | 8/2005 | Sakai | G01L 9/0054 73/754 |
| 2009/0071238 A1* | 3/2009 | Crano | B60C 23/0408 73/146.5 |

(Continued)

FOREIGN PATENT DOCUMENTS

| | | |
|---|---|---|
| JP | 2005-221453 A | 8/2005 |
| JP | 2007-196834 A | 8/2007 |

(Continued)

OTHER PUBLICATIONS

Office Action in the corresponding Chinese Patent Application No. 201280004985.4 dated Aug. 31, 2015.
International Search Report in PCT/JP2012/004630 dated Jul. 20, 2012.

*Primary Examiner* — Mark Rushing
(74) *Attorney, Agent, or Firm* — Global IP Counselors, LLP

(57) ABSTRACT

A transmitter apparatus can detect and transmit tire information, such as tire air pressure information, even when a puncture in the tire is repaired by a repairing agent. The transmitter apparatus includes a sensor detecting the state of gas in a tire cavity region as tire information; a transmitter transmitting the detected tire information; and a wall covering the sensor and transmitter. The wall forms an internal space divided from the tire cavity region and includes a communicating hole providing communication between the internal space and tire cavity region. An inside opening part of the hole in a housing surface facing the internal space has a greater opening area than an outside opening part of the hole in the housing surface facing the tire cavity region. A wall surface facing the communicating hole includes a recessed part recessed toward the housing surface including the outside opening part.

20 Claims, 14 Drawing Sheets

(56) References Cited

U.S. PATENT DOCUMENTS

2010/0236325 A1* 9/2010 Tanuma .................. G01L 17/00
73/146.3
2012/0222478 A1* 9/2012 Kanenari ............ B60C 23/0408
73/146.5

FOREIGN PATENT DOCUMENTS

| JP | 2007-326475 A | 12/2007 |
| JP | 2008-62730 A | 3/2008 |
| WO | 2011058743 A1 | 5/2011 |

* cited by examiner

US 9,358,847 B2

APPARATUS FOR TRANSMITTING TIRE INFORMATION AND INCLUDING A COMMUNICATION HOLE PROVIDING COMMUNICATION BETWEEN AN INTERNAL SPACE OF THE APPARATUS AND A TIRE CAVITY, AND TIRE AIR PRESSURE INFORMATION MONITORING SYSTEM USING THE SAME

CROSS-REFERENCE TO RELATED APPLICATIONS

This U.S. National stage application claims priority under 35 U.S.C. §119(a) to Japanese Patent Application No. 2011-160269, filed in Japan on Jul. 21, 2011, the entire contents of Japanese Patent Application No. 2011-160269 are hereby incorporated herein by reference.

FIELD OF THE INVENTION

The present invention relates to a transmitter apparatus provided inside a tire cavity region enclosed by a tire and a rim, and a tire information monitoring system.

DESCRIPTION OF THE RELATED ART

Conventionally, the air pressure of tires mounted on a vehicle have been desirably managed by inspections for improvements in tire durability, abrasion resistance and fuel consumption, or improvement in ride comfort and maneuverability. As a result, various types of tire pressure monitoring systems have been proposed. These systems generally include a transmission device that detects air pressure information about the tires mounted on a vehicle and transmits that information, and the systems obtain the air pressure information of the tires from the transmission device and monitor the air pressure of the tires.

Conversely, a puncture repair agent injected inside the tire cavity region interposed between the tire and the rim is often used when a tire goes flat. Since the puncture repair agent is a liquid, the puncture repair agent adheres to the inner surface of the tire that faces the tire cavity region and even adheres to the transmission device provided in the tire cavity region when the puncture repair agent is injected into the tire cavity region. In some cases, the puncture repair agent solidifies and covers an opening provided in the transmission device thus becoming a problem that adversely affects the measurement of the air pressure.

To address this problem, a wheel condition detection device has been proposed that is capable of retaining a normal detection condition by preventing the intrusion of foreign matter from a communicating part for detection as described in Japanese Patent Laid-open No. 2008-62730.

Specifically, a communicating part open and close mechanism that opens and closes a communicating hole provided in a case is provided on a tire pressure monitoring system (TPMS) valve of the wheel condition detection device. The puncture repair agent is restricted from intruding into a detection space through the communication hole when a puncture is repaired. The communicating part open and close mechanism is configured by a mechanical mechanism that includes a cover and a helical torsion spring, and the communicating hole is automatically opened and closed due to centrifugal force acting on the wheel.

Moreover, a tire pressure monitoring system and a tire pressure sensor unit have been proposed that are capable of informing a driver about the possibility that the tire pressure is low after the use of a puncture repair agent when repairing a puncture Japanese Patent Laid-open No. 2007-196834.

Specifically, the tire pressure monitoring system is equipped with a sensor unit provided in each tire of a vehicle and having an air pressure sensor and a transmitter, a receiver for receiving radio waves from the sensor units, and an engine control unit (ECU) for issuing an alarm when the pressure of a tire meets or falls below a threshold. A puncture determining means for determining a puncture in the tires, and a puncture repair agent use determining means for determining whether a puncture repair agent is used for repairing a puncture after a puncture has been determined, are provided in the system. The control ECU continues to issue the alarm even if a tire pressure value from the pressure sensor is a normal value when it is determined that a punctured tire was repaired using the puncture repair agent.

SUMMARY OF THE INVENTION

The communication hole open and close mechanism in the device described in Japanese Patent Laid-open No. 2008-62730 is configured by a mechanical function including a cover and a helical torsion spring thus making the device complicated and leading to the problem of high costs.

It is not known whether the tire air pressure information measured after repairing the tire using puncture repair agent is correct or not in the system and the units described in Japanese Patent Laid-open No. 2007-196834. As a result, the presence of a tire abnormality cannot be determined after a puncture repair.

Accordingly, an object of the present invention is to provide a tire information monitoring system that determines the presence or absence of a tire abnormality, and a transmission device that is able to suitably detect and transmit tire information such as tire air pressure information and the like even if a puncture of the tire has been repaired using a puncture repair agent, according to a new method different from the above conventional techniques.

One aspect of the present invention is a transmitter apparatus provided inside a tire cavity region enclosed by a tire and a rim.

The transmitter apparatus includes:
a sensor detecting a condition of gas filled in the tire cavity region as tire information;
a transmitter transmitting the detected tire information; and
a housing including a wall that covers the sensor and the transmitter, the housing being provided with an internal space separated from the tire cavity region by the wall and a communicating hole penetrating the wall and connecting the internal space and the tire cavity region;
the communicating hole being formed such that an inside opening part at a surface of the housing facing the internal space is formed with a wider opening area than an outside opening part at a surface of the housing facing the tire cavity region; and
a recessed part being provided on a surface of the wall facing the communicating hole, the recessed part recessed toward a surface of the housing that includes the outside opening part.

A portion of the recessed part nearest to the surface of the housing including the outside opening part preferably is provided in a position within 2 mm of the outside opening part.

The housing is preferably provided with a flat surface that extends around the outside opening part, and a projecting part that projects no less than 1 mm from the flat surface toward the tire cavity region, and the outside opening part is preferably provided at the top of the projecting part.

The recessed part is preferably provided in a plurality of locations in a circumferential region around the communicating hole.

The recessed part preferably has a shape that the recessed part extends in a radial direction centered on the outside opening part and has a width in the circumferential direction no more than 1 mm.

The recessed part is preferably provided in a position having axial symmetry when the linking direction of the communicating hole is the axial direction, and is provided within an angle range slanted ±15° with respect to the tire rotating direction.

A cross-sectional area of the communicating hole in the direction orthogonal to the direction penetrating the wall preferably increases in steps or continuously while proceeding from the outside opening part to the inside opening part.

Still another aspect of the present invention is a tire information monitoring system.

The system includes a transmitter apparatus and
a monitoring part determining the presence or absence of an abnormality of the tire on the basis of the tire information, and reporting the determination results,
the transmitter apparatus including:
a sensor detecting a condition of gas filled in a tire cavity region encompassed by the tire and a rim, as tire information;
a transmitter transmitting the detected tire information; and
a housing including a wall that covers the sensor and the transmitter, the housing being provided with an internal space separated from the tire cavity region by the wall and a communicating hole penetrating the wall and connecting the internal space and the tire cavity region;
the communicating hole being formed such that an inside opening part at a surface of the housing facing the internal space is formed with a wider opening area than an outside opening part at a surface of the housing facing the tire cavity region; and
a recessed part being provided on a surface of the wall facing the communicating hole, the recessed part recessed toward a surface of the housing that includes the outside opening part.

The aforementioned transmission device and tire information monitoring system are able to appropriately measure and acquire tire information such as tire pressure information even if a flat tire is fixed using a puncture repair agent.

DESCRIPTION OF EMBODIMENTS

The following describes a transmitter apparatus and a tire information monitoring system of the present invention.
(Outline of Tire Pressure Monitoring System)

Figure 1:
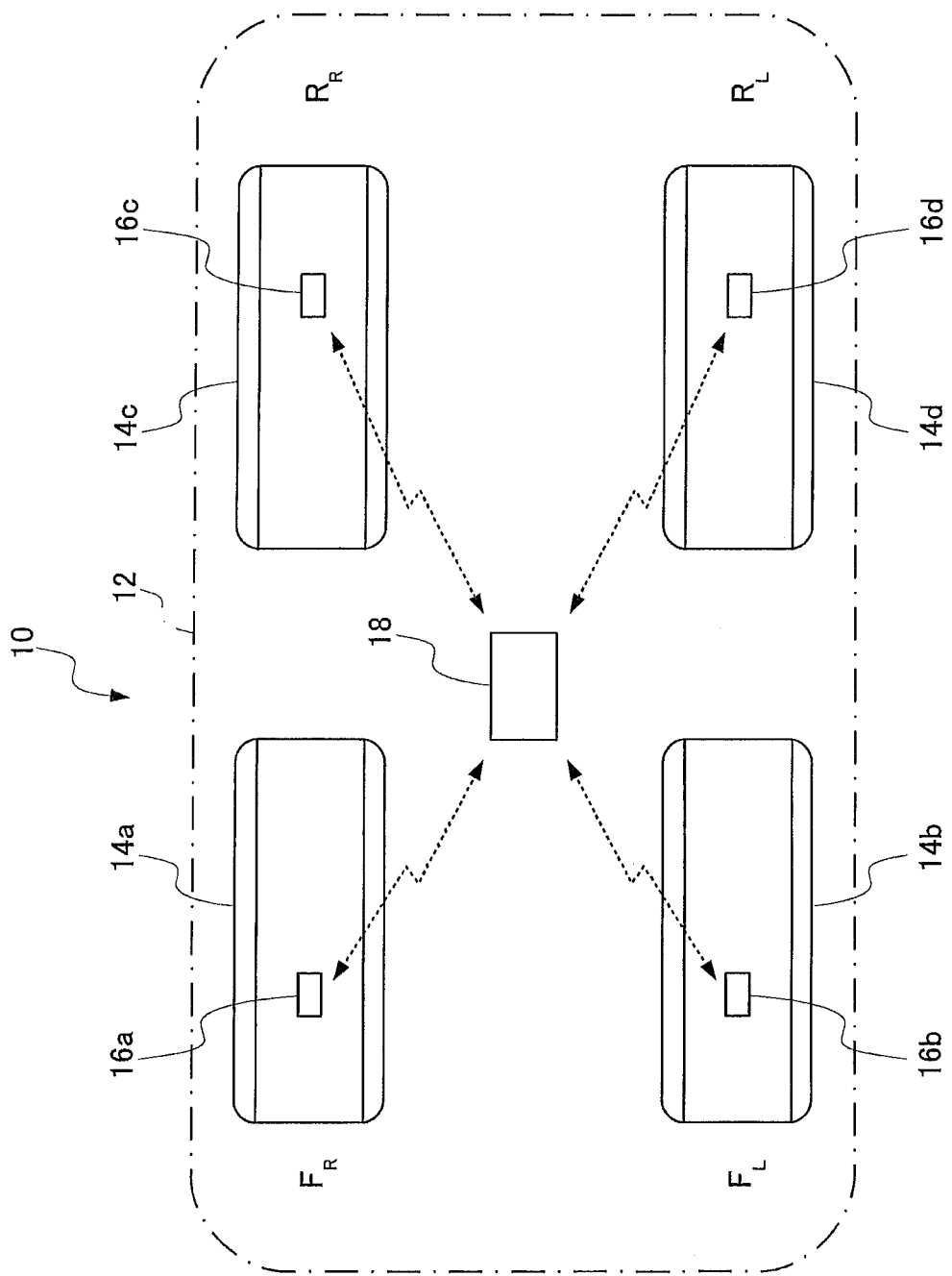
FIG. 1 is an overview of a tire pressure monitoring system that is according to one embodiment of a tire information monitoring system.

FIG. 1 is an overview of a tire pressure monitoring system 10 that is an embodiment of a tire information monitoring system.

The tire pressure monitoring system 10 (referred to as "system" below) is mounted on a vehicle 12. The system 10 has air pressure information transmitting devices (hereinbelow referred to as transmitting devices) 16a, 16b, 16c, and 16d respectively provided in tire cavity regions of tires 14a, 14b, 14c, and 14d on the wheels of the vehicle 12, and a monitoring device 18.

The transmitting devices 16a, 16b, 16c, and 16d detect information related to the air pressure filled in each of the tire cavity regions enclosed by the tire 14 and a rim 19, as tire information, and transmits the tire information to the monitoring device 18 by radio. Hereinbelow, the transmitting devices 16a, 16b, 16c, and 16d will be collectively referred to as the transmitting device 16 when describing the transmitting devices 16a, 16b, 16c, and 16d collectively.
(Configuration of Transmitting Devices)

Figure 2:
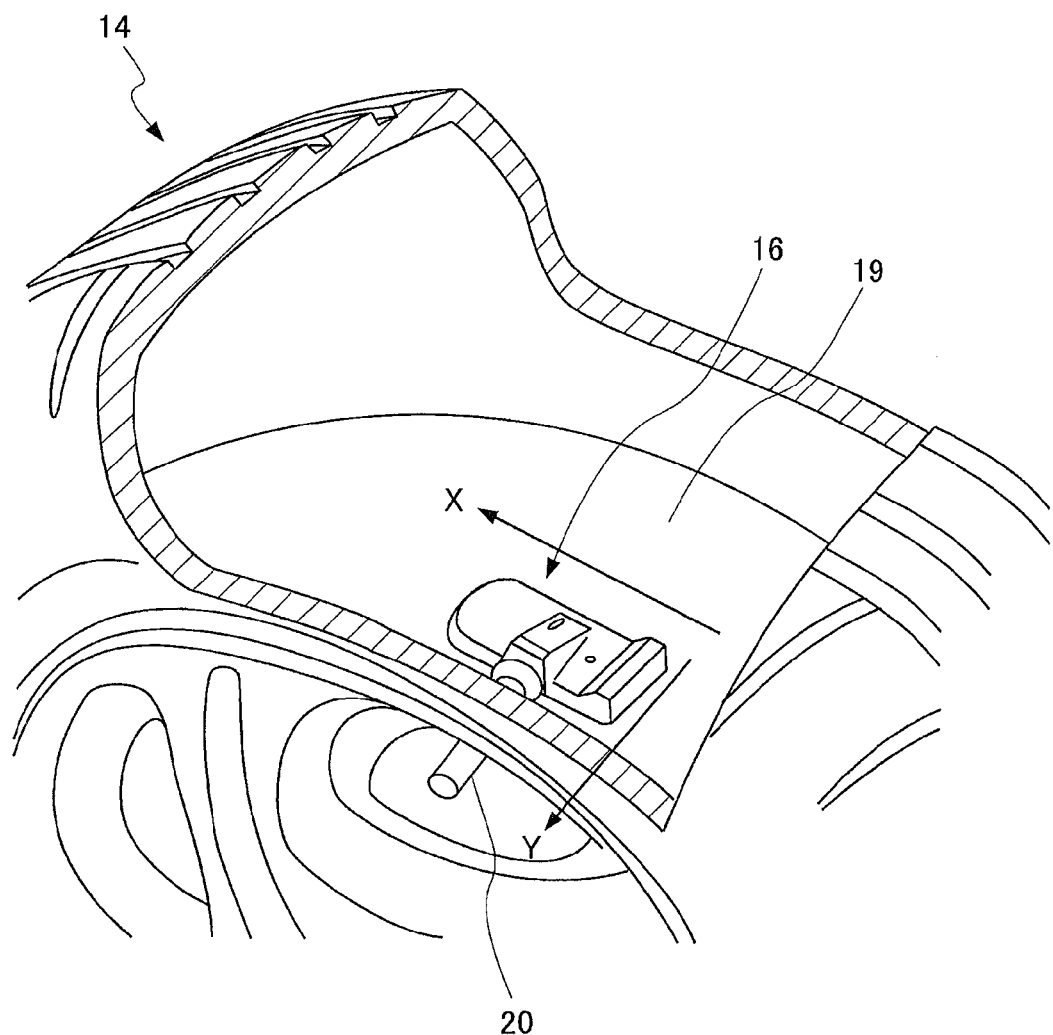
FIG. 2 describes an example of a method for fixing a transmitting device illustrated in FIG. 1 inside a tire cavity region.
Figure 3:
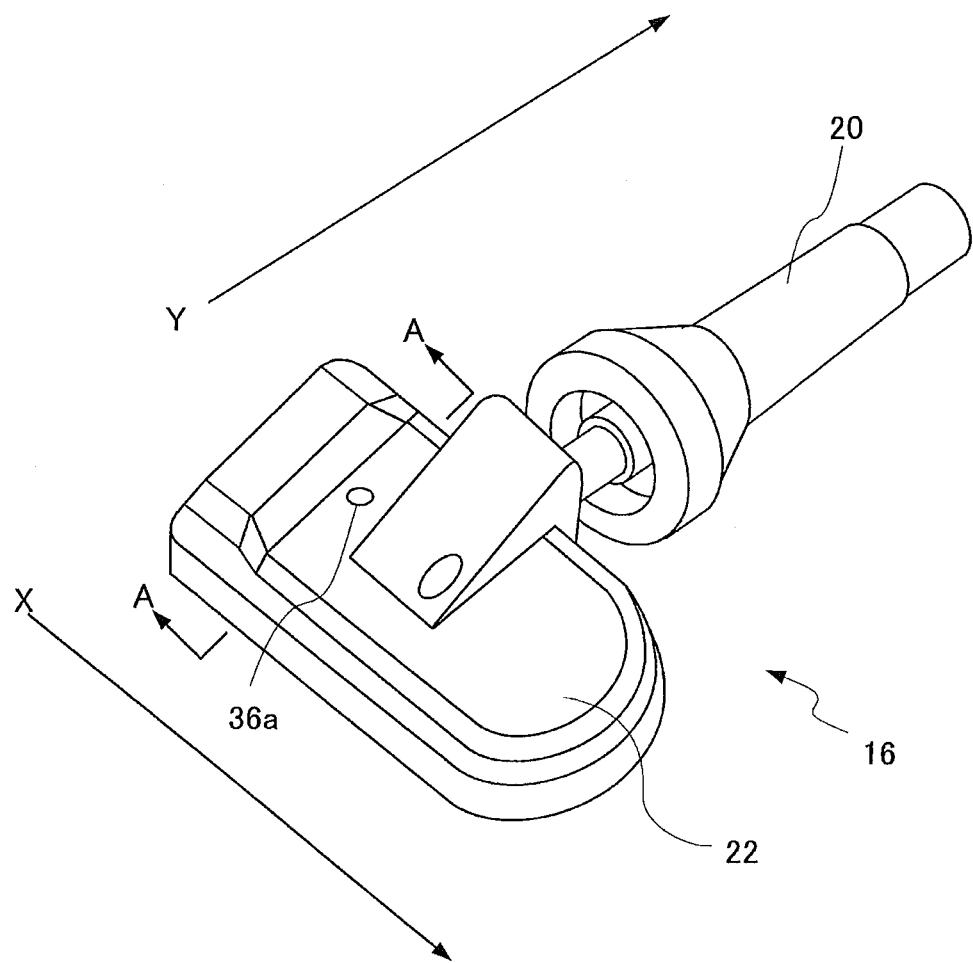
FIG. 3 is a perspective view of an entire device made by the integration of the transmitting device illustrated in FIG. 2 with a tire valve.

FIG. 2 illustrates an example of a method for fixing the transmitting device 16 in a tire cavity region. FIG. 3 is a perspective view of an entire device made by the integration of the transmitting device 16 illustrated in FIG. 2 with a tire valve 20.

The transmitting device 16 is provided at an end part of the tire valve 20 that extends toward the tire cavity region, and is fixedly disposed inside the tire cavity region by the tire valve 20 being mechanically fixed to the rim 19 as illustrated in FIG. 2. The transmitting device 16 has a housing 22 that extends in the circumferential direction (X direction in FIG. 2) of the tire 14. The circumferential direction of the tire 14 is the rotating direction of the tire 14 when the tire 14 is rotated around the tire rotational axis.

In the present embodiment, the tire valve 20 is provided so as to extend in a direction orthogonal (Y direction in FIG. 2) to the circumferential direction (X direction in FIG. 2) of the tire 14.

Figure 4:
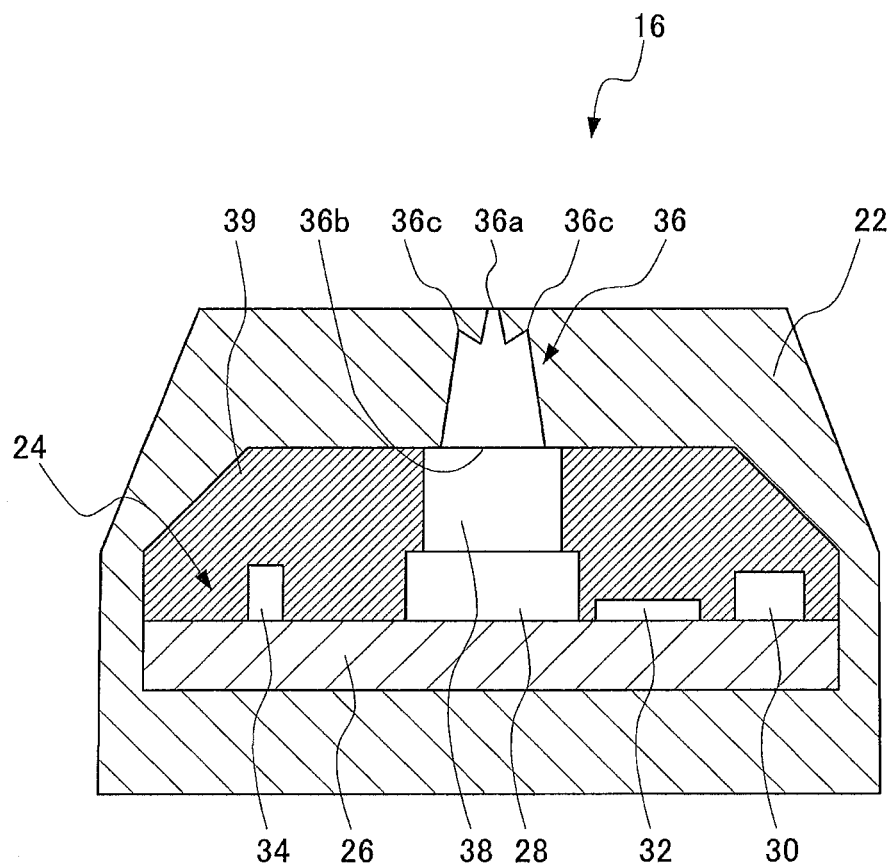
FIG. 4 is an arrow cross-section view of the transmitting device along line A-A illustrated in FIG. 3.

FIG. 4 is an arrow cross-section view of the transmitting device 16 along line A-A illustrated in FIG. 3. As illustrated in FIG. 4, the transmitting device 16 has the housing 22 and a circuit 24 provided inside the housing 22. The housing 22 includes walls that cover the circuit 24. The circuit 24 has a base plate 26, a sensor unit 28 provided on the base plate 26, a transmitter 30, a processing unit 32, a power supply unit 34, and an antenna 40 (see FIG. 5). An internal space 38 and a below mentioned communicating hole 36 are provided inside the housing 22 by the above mentioned walls.

The sensor unit 28 has a sensor surface for detecting air pressure, and the sensor surface faces the internal space 38.

The communicating hole 36 that links the internal space 38 in the housing 22 and the tire cavity region is provided in the housing 22 so as to penetrate a wall of the housing 22. An outside opening part 36a of the communicating hole 36 is provided on the surface of the housing 22 on which the communicating hole 36 faces the tire cavity region. That is, the outside opening part 36a is provided to open toward the outside in the tire radial direction. Conversely, an inside opening part 36b of the communicating hole 36 is provided on the surface of the housing 22 on which the communicating hole 36 faces the internal space 38.

A recessed part 36c that is recessed toward the surface (hereinbelow referred to as opening surface) of the housing 22 that includes the outside opening part 36a is provided on the surface of the wall of the housing 22 facing the communicating hole 36. The reason for providing the recessed par 36 is to prevent the outside opening part 36a from being covered by a liquid such as puncture repair agent from the internal space 38 when the liquid flows into the internal space 38 from the outside opening part 36a. Specifically, when a liquid such as the puncture repair agent flows into the internal space 38 from the outside opening part 36a, the liquid moves along the wall surface of the housing 22 to the outside opening part 36a due to centrifugal force caused by the rotation of the tire. Since the recessed part 36c that is recessed toward the opening surface of the outside opening part 36a is provided in the surface of the wall facing the communicating hole 36, the liquid is led into the recessed part 36c before flowing along the surface of the wall facing the communicating hole 36 to reach the outside opening part 36a. As a result, since adhesion of the liquid on the outside opening part 36a can be suppressed, the liquid covering the outside opening part 36a from the internal space side can be prevented in comparison to when the recessed part 36c is not provided.

Consequently, even if a puncture in a tire is fixed using a puncture repair agent, tire information such as tire pressure information can be appropriately measured and acquired.

The communicating hole 36, the outside opening part 36a, the inside opening part 36b, and the recessed part 36c will be explained in detail below.

The inside region covered by the walls of the housing 22 is filled with a sealing resin 39 as an internal member while keeping the internal space 38. Specifically, the internal space 38 is defined by the wall surface of the housing 22 and by the inside wall of the internal member provided in the housing 22. Therefore, the internal space 38 is narrower than the inside region covered by the wall of the housing 22. As illustrated in FIG. 4, the cross-section of the internal space 38 is enlarged from the inside opening part 36b of the communicating hole 36.

The communicating hole 36 is provided in the housing 22 as the only path that links the internal space 38 and the tire cavity region. This is because if, for example, a plurality of communicating holes 36 were provided, the liquid such as the puncture repair agent could easily flow into the internal space 38 from the communicating holes 36.

While at least one wall surface of the internal space 38 is made by the sealing resin 39, the internal member is not limited to the sealing resin 39. A resin formed in a certain shape may be disposed as the internal member.

Figure 5:
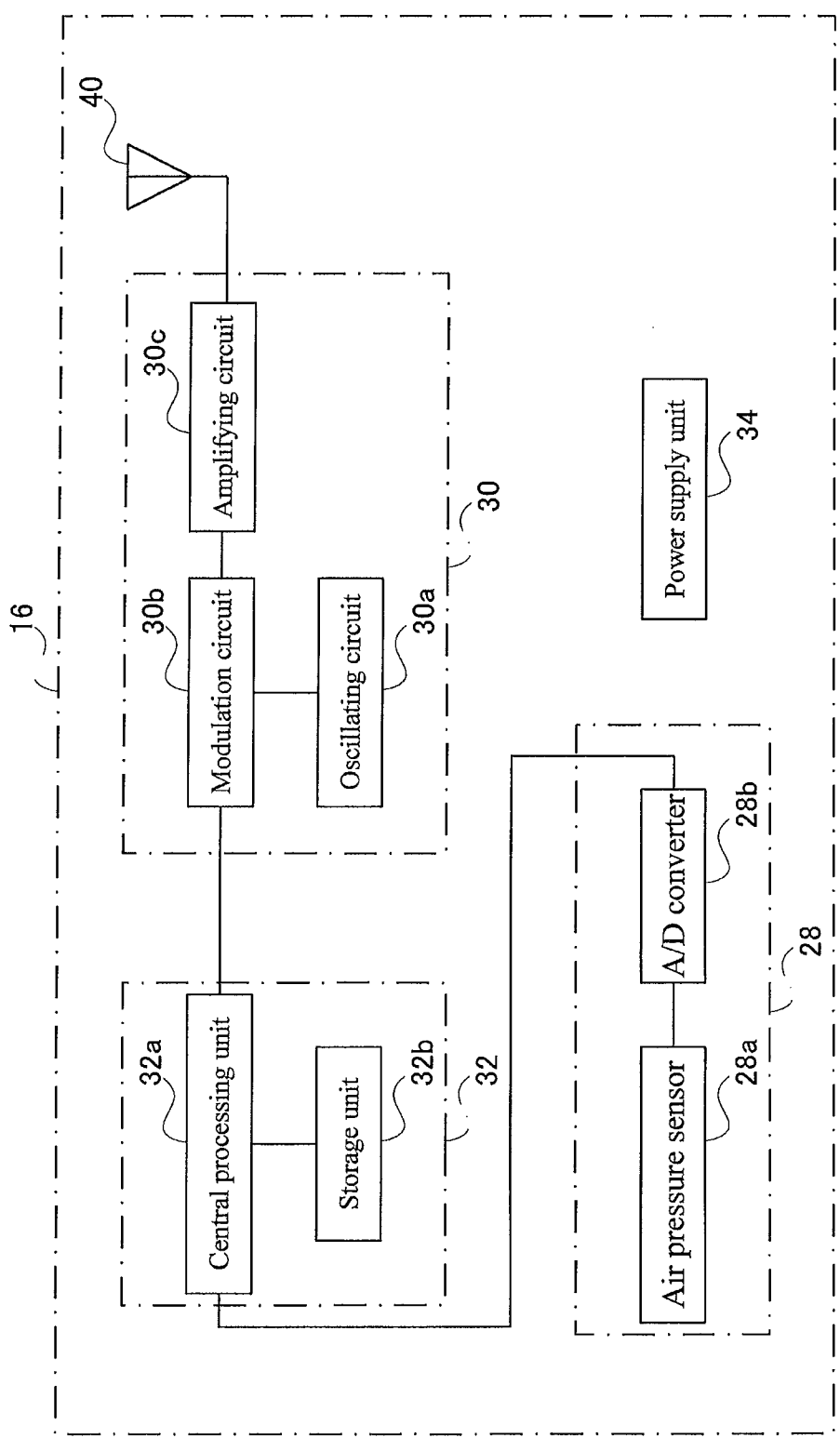
FIG. 5 illustrates a circuitry of the transmitting device illustrated in FIG. 1.

FIG. 5 illustrates a circuitry of the transmitting device 16.

The sensor unit 28 has an air pressure sensor 28a and an A/D converter 28b. The air pressure sensor 28a senses air pressure in the internal space 38 inside the housing 22 and outputs a pressure signal. Since the internal space 38 is linked to the tire cavity region via the communicating hole 36, the air pressure sensor 28a is able to sense the air pressure in the tire cavity region.

The A/D converter 28b digitally-converts the pressure signal outputted by the air pressure sensor 28a and outputs pressure data.

The processing unit 32 has a central processing unit 32a and a storage unit 32b. The central processing unit 32a operates according to a program stored in a semiconductor memory of the storage unit 32b. The central processing unit 32a performs controls so that the pressure data, which is the air pressure information and is sent from the sensor unit 28, is transmitted to the monitoring device 18 through the transmitter 30 at certain intervals, for example every five minutes, when the central processing unit 32a operates due to the supply of electrical power. Identification information unique to each transmitting device 16 is previously stored in the storage unit 32b, and the central processing unit 32a performs controls so that the pressure data is transmitted to the monitoring device 18 along with the identification information.

The storage unit 32b is equipped with a ROM for storing a program for operating the central processing unit 32a, and a rewritable non-volatile memory such as an EEPROM. The identification information unique to the transmitting device 16 is stored in a non-rewritable region of the storage unit 32b.

The transmitter 30 has an oscillating circuit 30a, a modulation circuit 30b, and an amplifying circuit 30c.

The oscillating circuit 30a generates a carrier wave signal such as a RF signal of a 315 MHz frequency band.

The modulation circuit 30b uses the pressure data sent from the central processing unit 32a and the identification information unique to the transmitting device 16 to modulate the carrier wave signals and generate a transmission signal. A system such as amplitude-shift keying (ASK), frequency modulation (FM), phase modulation (PM), or phase-shift keying (PSK) may be used for the modulation system.

The amplifying circuit 30c amplifies the transmission signal generated by the modulation circuit 30b. The amplified transmission signal is transmitted by radio through the antenna 40 to the monitoring device 18.

The power supply unit 34 uses a secondary battery for example to provide electrical power to the sensor unit 28, the transmitter 30, and the processing unit 32.

(Monitoring Device Configuration)

Figure 6:
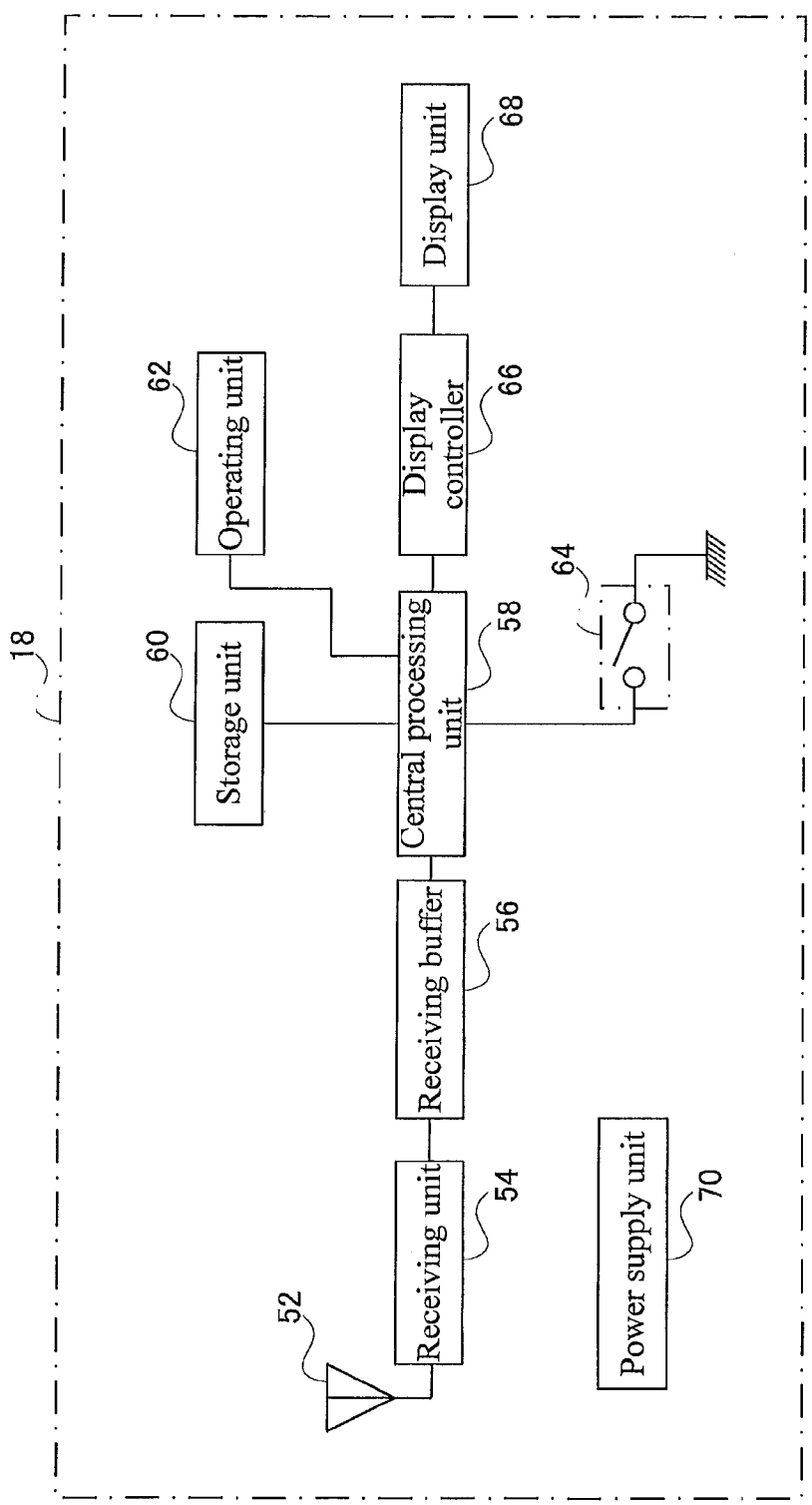
FIG. 6 illustrates a circuitry of the monitoring device illustrated in FIG. 1.

FIG. 6 is a circuitry diagram of the monitoring device 18.

The monitoring device 18 is disposed, for example, at the location of the driver's seat in the vehicle 12 and reports air pressure information to the driver. The monitoring device 18 has an antenna 52, a receiving unit 54, a receiving buffer 56, a central processing unit 58, a storage unit 60, an operating unit 62, a switch 64, a display controller 66, a display unit 68, and a power supply unit 70.

The antenna 52 conforms to the same frequency as the transmitting frequency of the transmitting device 16, and is connected to the receiving unit 54.

The receiving unit 54 receives the transmission signal at a certain frequency transmitted by the transmitting device 16, conducts demodulation, and extracts data including the pressure data and the identification information. The data is outputted to the receiving buffer 56.

The receiving buffer 56 temporarily stores the data including the pressure data and the identification information outputted from the receiving unit 54. The stored data including the pressure data and the identification information is outputted to the central processing unit 58 according to an instruction from the central processing unit 58.

The central processing unit 58 is mainly configured with a CPU and operates on the basis of a program stored in the storage unit 60. The central processing unit 58 monitors the air pressure of the tires 14a to 14d according to the identification information on the basis of the received data that includes the pressure data and the identification information. Specifically, the central processing unit 58 determines the presence or absence of an abnormality of the tires 14a to 14d on the basis of the pressure data, and reports the determination results to the driver. Determining the presence or absence of a tire abnormality signifies the determination that the air pressure is, for example, abnormally low or has dropped dramatically in a short time, or that a tire has a puncture.

The central processing unit 58 outputs the determination result to the display controller 66 and the determination result is outputted on the display unit 68 via the display controller 66.

Furthermore, the central processing unit 58 conducts initialization of the communication protocol and the like with the transmitting device 16 in accordance with information from the operating unit 62 or information from the switch 64. The setting of a determination condition for determining the presence or absence of a tire abnormality by the central processing unit 58 may be conducted based on information from the operating unit 62.

The storage unit 60 has a ROM in which is stored a program for operating the CPU of the central processing unit 58, and a non-volatile memory such as an EEPROM. A table of communication protocols with the transmitting device 16 is stored during the production process in the storage unit 60. The transmitting device 16 and the monitoring device 18 communicate in the initial stage with a preset communication protocol. Information such as communication protocols, transfer bit rates, data formats and the like is included in correspondence with the unique identification information of the transmitting device 16 in the communication protocol table. The information can be freely reset with an input from the operating unit 62.

The operating unit 63 includes an input device such as a keyboard, and is used for inputting various types of information and conditions. The switch 64 is used for instructing the central processing unit 58 to start initialization.

The display controller 66 controls the display unit 68 to display tire air pressure associated with the mounting positions of the tires 14a to 14d in accordance with the determination result from the central processing unit 57. The display controller 65 controls the display unit 66 to display the determination result that indicates the tire puncture condition at the same time.

The power supply unit 70 supplies electrical power through a power source line, not illustrated, by controlling the electrical power supplied from a battery mounted in the vehicle 12 to a voltage suitable for each unit of the monitoring device 18.

The transmitting device 16 and the monitoring device 18 are configured in this way.

(Communicating Hole of Transmitting Device)

The communicating hole 36, the outside opening part 36a, the inside opening part 36b, and the recessed part 36c will be explained in detail below.

As illustrated in FIG. 4, the cross-section of the communicating hole 36 that links the internal space 38 in the housing 22 of the transmitting device 16 and the tire cavity region increases as the communicating hole 36 proceeds from the outside opening part 36a toward the inside opening part 36b.

Specifically, the opening surface area of the inside opening part 36b of the communicating hole 36 is larger than that of the outside opening part 36a. By forming the opening surface area of the inside opening part 36b larger than the opening surface area of the outside opening part 36a, capillary action is less likely to occur than in a conventional case in which the opening surface areas of the outside opening part and the inside opening part of the communicating hole are the same. As a result, even if liquid such as the puncture repair agent adheres to the outside opening part 36a, it becomes more difficult for the liquid such as the puncture repair agent to flow into the communicating hole 36 and further into the internal space 38.

The opening surface area of the outside opening part 36a of the communicating hole 36 is, for example, no more than 0.4 mm$^2$. By making the opening surface area of the outside opening part 36a no more than 0.4 mm$^2$, the liquid such as the tire puncture repair agent is less likely to flow into the communicating hole 36.

Moreover, making the opening surface area of the inside opening part 36b four times larger, for example, than the opening surface area of the outside opening part 36a is preferable with regard to the features of preventing the puncture repair agent from flowing into the communicating hole 36 and of preventing the communicating hole 36 from being covered by the puncture repair agent.

Figure 7A:
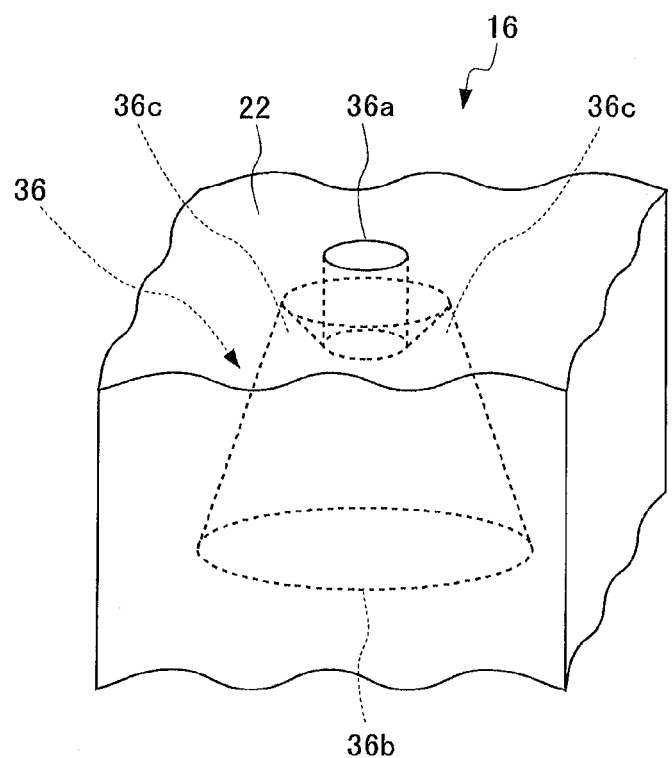
FIGS. 7A and 7B describe shapes of the communicating hole illustrated in FIG. 4.
Figure 7B:
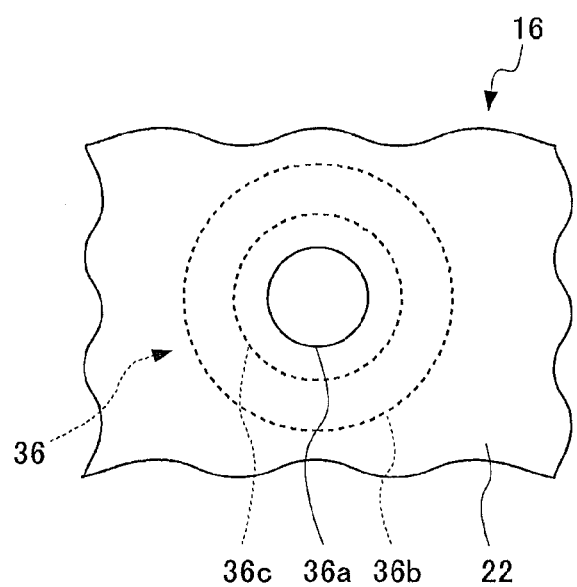

FIGS. 7A and 7B describe shapes of the communicating hole illustrated in FIG. 4. FIG. 7A is a perspective view of the communicating hole 36 and FIG. 7B is a plan view of the communicating hole 36.

The communicating hole 36 has a roughly conical shape, and the recessed part 36c is provided continuously over the full circumference around the communicating hole 36 inside the housing 22 as illustrated in FIGS. 7A and 7B. Consequently, even in the unlikely event that the liquid such as the puncture repair agent does flow into the internal space 38, the liquid that travels along the surface of the wall facing the communicating hole 36 and moves toward the outside opening part 36a is able to reliably flow into the recessed part 36c.

The shape of the communicating hole 36 including the recess formed by the recessed part 36c may demonstrate rotational symmetry as illustrated in FIGS. 7A and 7B or non-rotational symmetry around an axis formed by a straight line passing through the centers of both the outside opening part 36a and the inside opening part 36b.

Figure 8:
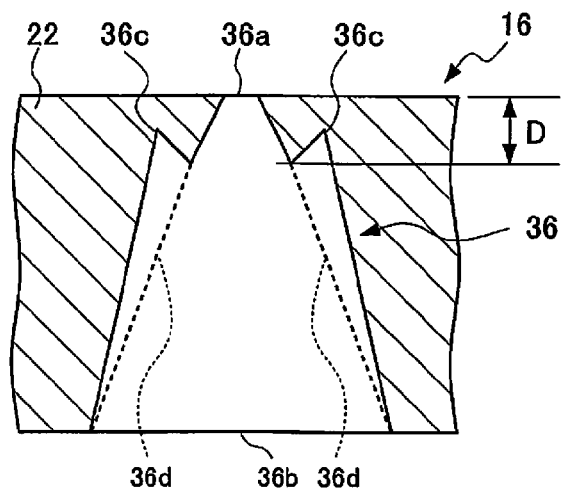
FIG. 8 is an enlargement of the communicating hole illustrated in FIG. 4.

A more detailed explanation of the recessed part 36c will be provided below. FIG. 8 is an enlarged cross-sectional view of the communicating hole 36 illustrated in FIG. 4.

As described above, the recessed part 36c is formed to be recessed toward the opening surface of the outside opening part 36a on the surface of the wall of the housing 22 facing the communicating hole 36. An opening section 36d of the recessed part 36c is formed on a plane that connects, along the surface of the wall facing the communicating hole 36, an end part of the recessed part 36c which is located on the outside opening part 36a and an end part of the recessed part 36c which is located on the inside opening part 36b. The opening section 36d is a virtually demarcated space. The recessed part 36c being recessed toward the opening surface of the outside opening part 36a signifies that the most recessed portion of the recessed part 36c is located closer to the opening surface of the outside opening part 36a than the opening section 36d.

Moreover, a portion (e.g., the edge closest to the outside opening part 36a among the edges of the opening section 36d) of the opening section 36d of the recessed part 36c is provided at a location within a certain distance D (e.g., 2 mm, or preferably 1 mm, in the direction passing through the centers of both the outside opening part 36a and the inside opening part 36b) from the outside opening part 36a. As a result, since the recessed part 36c may be provided at a position near the outside opening part 36a, even if the liquid such as the puncture repair agent flows into the communicating hole 36 from the outside opening part 36a, the liquid would quickly flow into and pool in the recessed part 36c when the tire is rotated.

Rounding off or cutting off the corner in order to prevent the flow of the puncture repair agent from stopping may be performed on the opening section 36d of the recessed part 36c.

Alternative Embodiment 1

An example (modified example 1) of a communicating hole 36 different from the communicating hole 36 illustrated in FIG. 4 will be explained next with reference to FIGS. 9A and 9B.

Figure 9A:
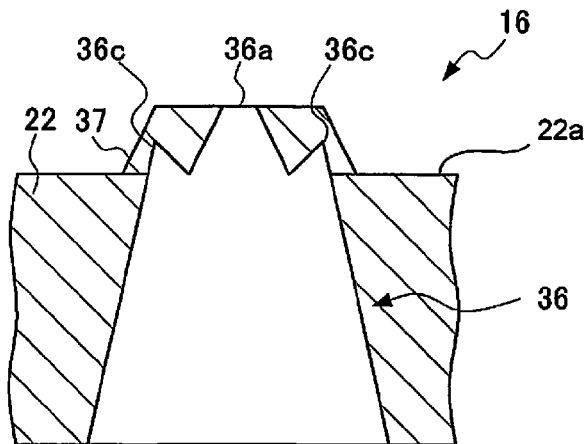
FIGS. 9A and 9B describe other examples of the communicating hole illustrated in FIG. 4.

As illustrated in FIG. 9A, the housing 22 has a flat surface 22a that extends around the outside opening part, and a projecting part 37 that projects 1 mm or more from the flat surface 22a toward the tire cavity region. The outside opening part 36a of the communicating hole 36 is provided on the top part of the projecting part 37. Even if the puncture repair agent is introduced into the tire cavity region for a puncture repair, adhesion of the puncture repair agent to the outside opening part 36a can be prevented by providing the outside opening part 36a on the top part of the projecting part 37. In particular, by providing the projecting part 37 in the housing 22 so as to project to the outside in tire radial direction, the puncture repair agent that adheres to the projecting part 37 can be scattered to the outside in tire radial direction due to the centrifugal force of the rotation of the tire. As a result, the puncture repair agent can be effectively prevented from adhering to the outside opening part 36a.

Figure 9B:
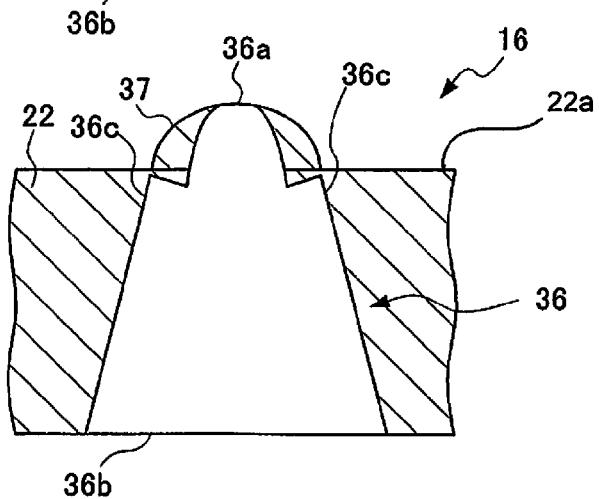

The shape of the projecting part 37 may be formed in a pyramid shape, a conical shape, a truncated pyramid shape, a truncated conical shape, or a hemisphere shape as illustrated in FIG. 9B. Forming the projecting part 37 as a hemisphere shape is preferable since the risk of deformation or damage to the projecting part 37 due to an external force (e.g., a force received when mounting or removing the tire on or from the rim) can be reduced since a sufficient thickness can be assured between the surface of the wall facing the communicating hole 36 and the outer surface of the projecting part 37.

Alternative Embodiment 2

An example (modified example 2) of a communicating hole 36 different from the communicating hole 36 illustrated in FIG. 4 will be explained next with reference to FIGS. 10A and 10D. The cross-sectional shapes of the communicating hole 36 illustrated in FIG. 10A to 10D are different from that of the communicating hole 36 illustrated in FIG. 4.

Figure 10A:
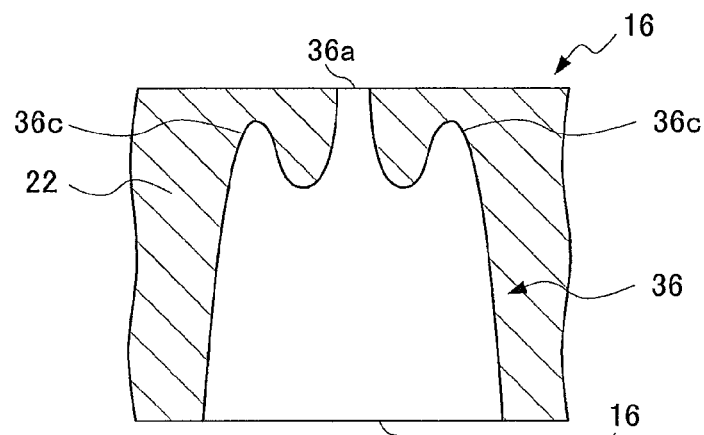
FIGS. 10A to 10D describe still other examples of the communicating hole illustrated in FIG. 4.
Figure 10B:
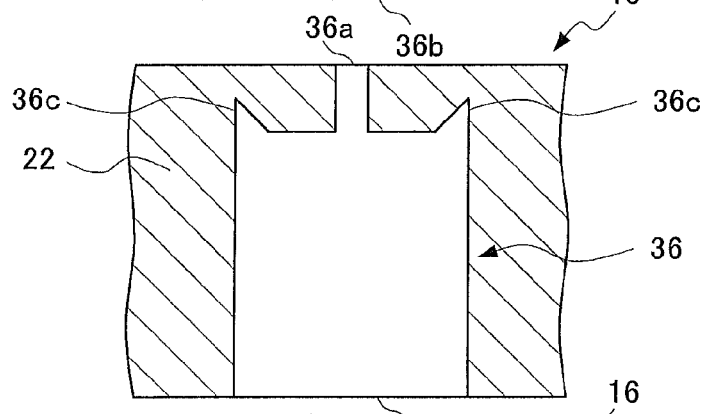
Figure 10C:
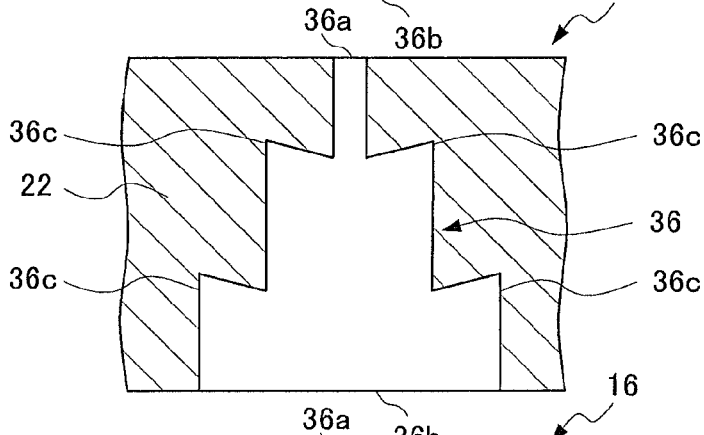
Figure 10D:
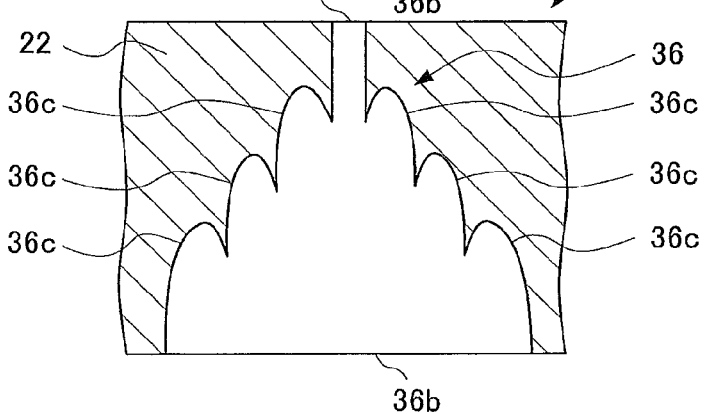

For example as illustrated in FIGS. 10A and 10B, the cross-sectional shape of the communicating hole 36 may be formed in a convex shape with curved lines or straight lines. The cross-section of the recessed part 36c may be formed with acute angles, with obtuse angles, or with arc shapes. Furthermore as illustrated in FIGS. 10C and 10D, a plurality of recessed parts 36c may be provided so that the cross-sectional area in a direction orthogonal to the direction penetrating the wall of the housing 22 of the communicating hole 36 increases in steps from the outside opening part 36a to the inside opening part 36b. The recessed part 36c may be provided so that the hole cross-sectional area of the communicating hole 36 increases continuously from the outside opening part 36a to the inside opening part 36b.

Even if the communicating hole 36 is formed in any of the shapes illustrated in FIGS. 10A to 10D, the liquid such as the puncture repair agent that flows into the communicating hole 36 from the outside opening part 36a is able to flow into and pool in the recessed part 36c when the tire is rotating.

Alternative Embodiment 3

Examples (modified example 3) of the communicating hole 36 different from the communicating hole 36 illustrated in FIG. 4 will be explained next with reference to FIGS. 11 to 14. The difference of the communicating holes 36 illustrated in FIGS. 11 to 14 from the communicating hole 36 illustrated in FIG. 4 is that the recessed part 36c is provided in a plurality of locations in the region surrounding the communicating hole 36.

Figure 11A:
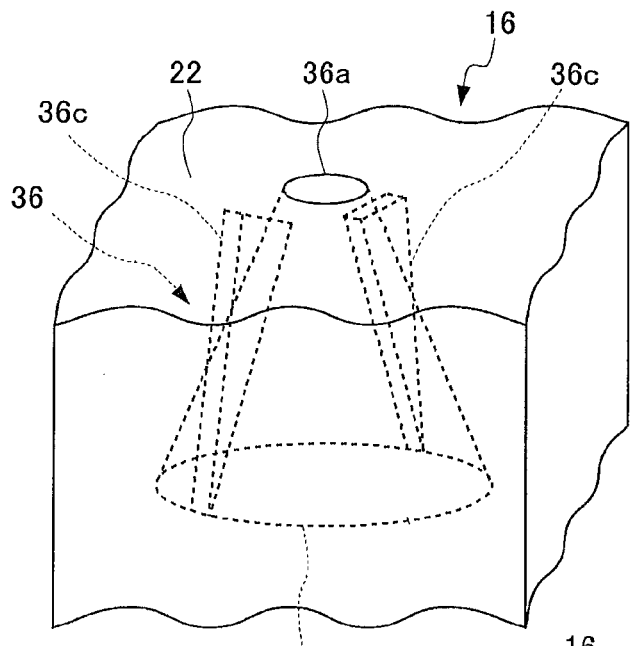
FIGS. 11A to 11C describe other examples of recessed part illustrated in FIG. 7.
Figure 11B:
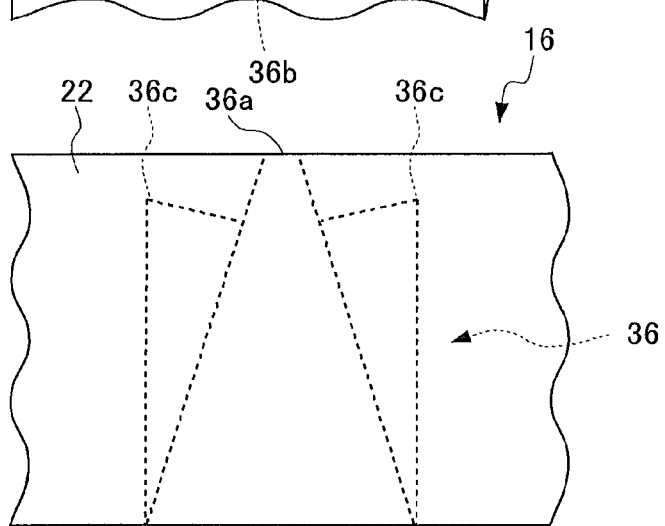
Figure 11C:
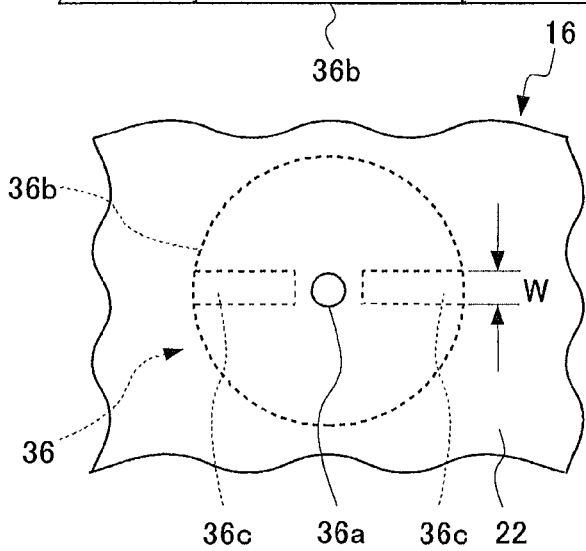

FIGS. 11A to 11C describe examples of the modified example 3. FIG. 11A is a perspective view of the communicating hole 36, FIG. 11B describes the communicating hole 36, and FIG. 11C is a plan view of the communicating hole 36. The recessed parts 36c illustrated in FIG. 11 are provided as a pair located with axial symmetry with the linking direction (in the present embodiment, the direction of a straight line passing through the centers of the outside opening part 36a and the inside opening part 36b) of the communicating hole 36 as the axis. The pair of recessed parts 36c are formed as grooves that extend radially from the center of the axis.

As illustrated in FIG. 11C, a width dimension W of the recessed part 36c, that is, the width in the circumferential direction of the communicating hole 36 and having a shape that extends in the radial direction from the center of the communicating hole 36, is preferably small (e.g., 1 mm or less). Since capillary action is more likely to occur in the aforementioned recessed part 36c compared to a recessed part 36c with a large width dimension W, the liquid such as the puncture repair agent flows more easily into the recessed part 36c when the liquid flows from the outside opening part 36a to the communicating hole 36.

Figure 12A:
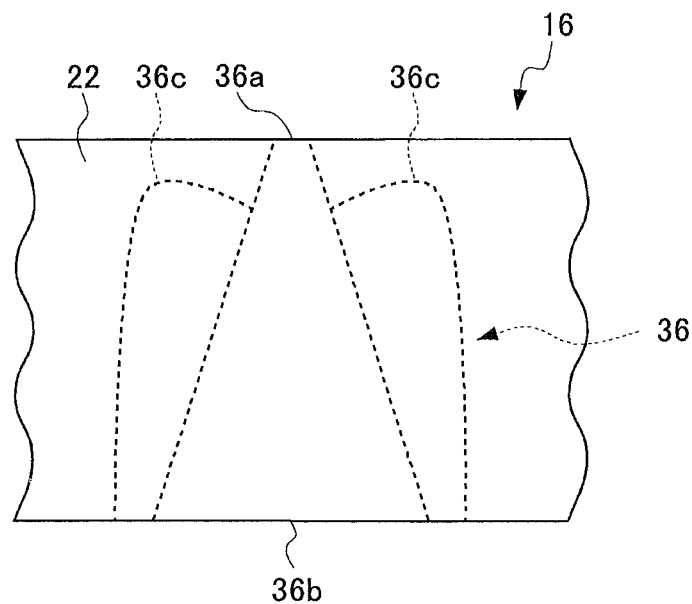
FIGS. 12A and 12B describe other examples of the recessed part illustrated in FIG. 7.
Figure 12B:
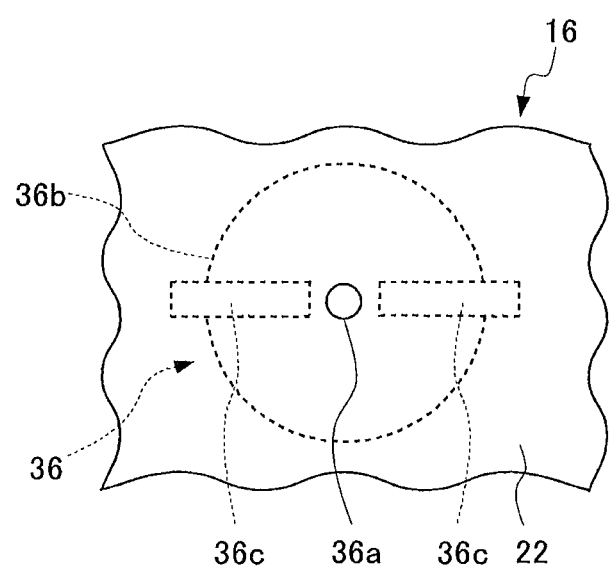

FIGS. 12A and 12B describe another example that is different from the example illustrated in FIG. 11. FIG. 12A describes the communicating hole 36 and FIG. 12B is a plan view of the communicating hole 36. As illustrated in FIG. 12, the recessed part 36c may be formed so that the recessed part 36c projects from the inside opening part 36b along the opening surface of the inside opening part 36b.

Figure 13A:
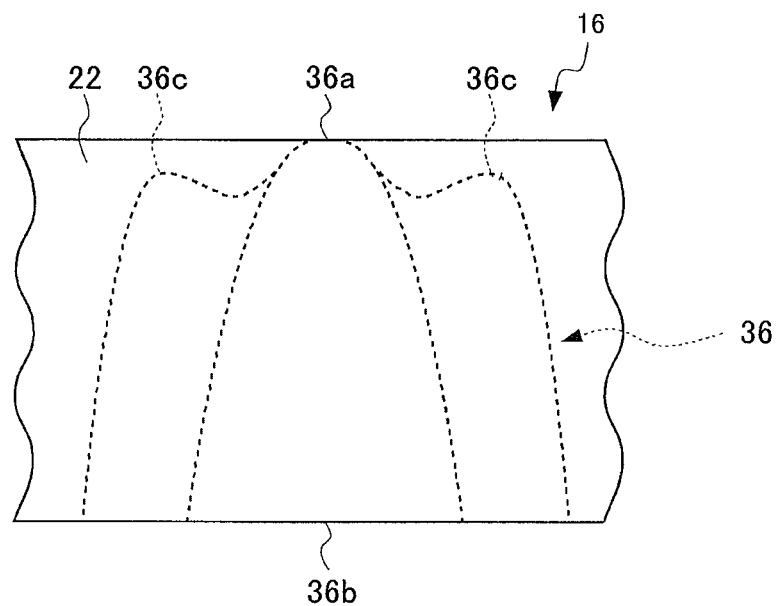
FIGS. 13A and 13B describe other examples of the recessed part illustrated in FIG. 7.
Figure 13B:
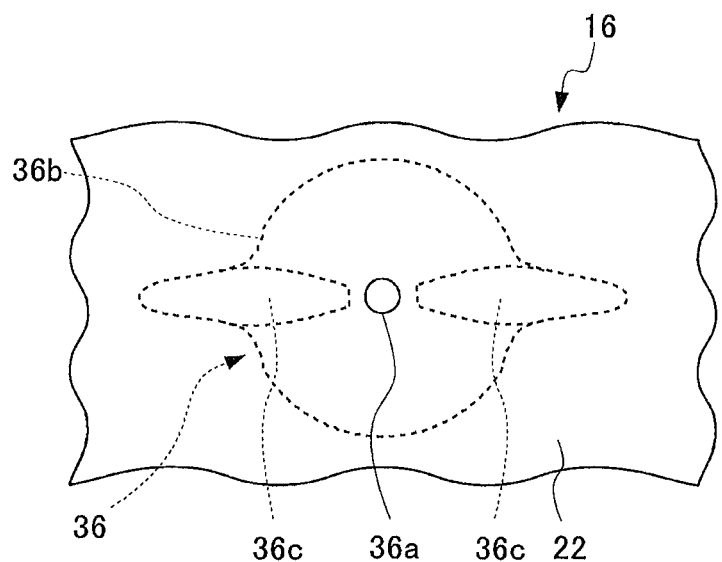

FIGS. 13A and 13B describe another example that is different from the examples illustrated in FIGS. 11 and 12. FIG. 13A describes the communicating hole 36 and FIG. 13B is a plan view of the communicating hole 36. As illustrated in FIG. 13, the recessed part 36c may be formed so that a portion of the width of the recessed part 36c is increased.

Figure 14A:
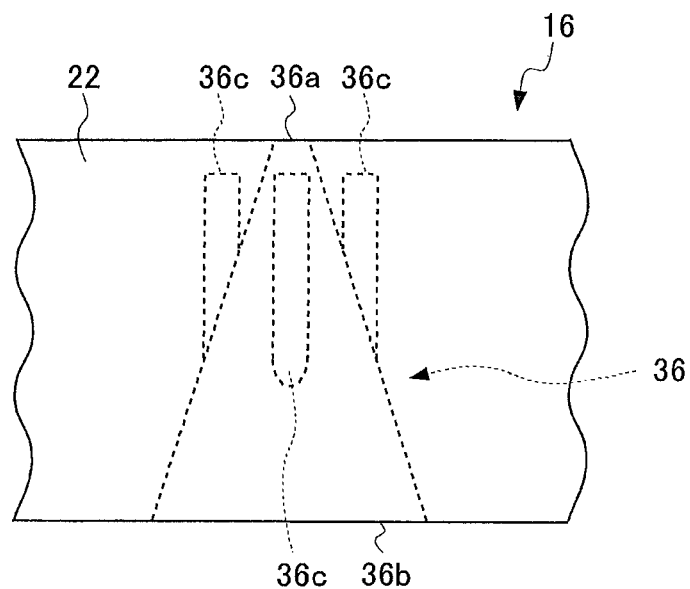
FIGS. 14A and 14B describe other examples of the recessed part illustrated in FIG. 7.
Figure 14B:
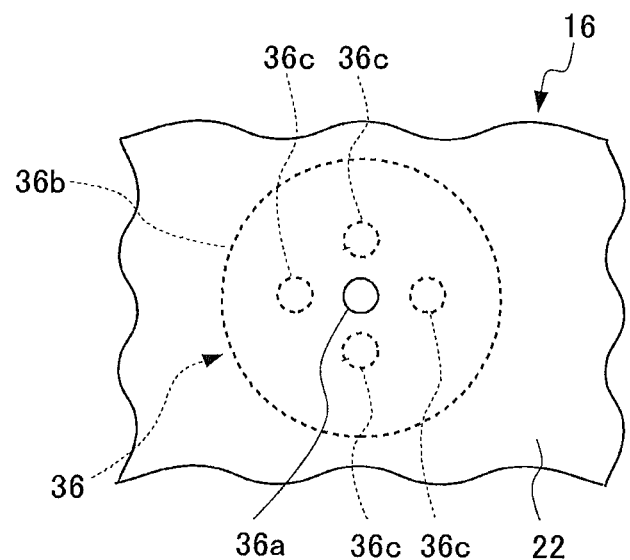

FIGS. 14A and 14B describe another example that is different from the examples illustrated in FIGS. 11 to 13. FIG. 14A describes the communicating hole 36 and FIG. 14B is a plan view of the communicating hole 36. As illustrated in FIG. 14, the recessed part 36c may be formed in a cylindrical shape that extends in the linking direction of the communicating hole 36.

Figure 15:
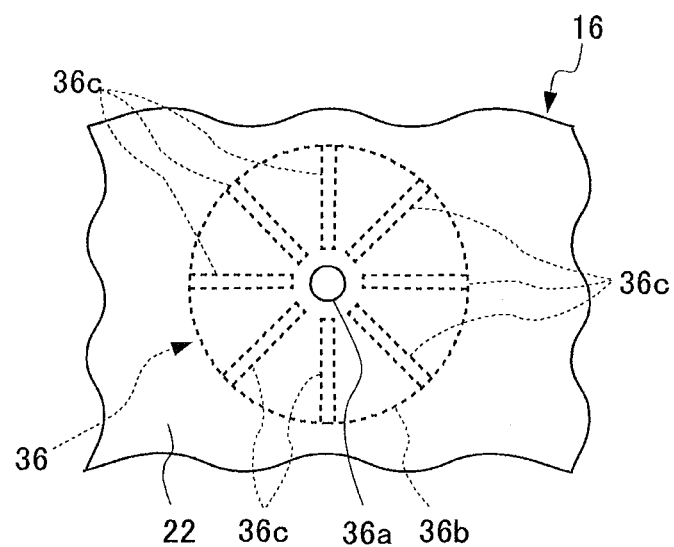
FIG. 15 is a plan view of another example of the recessed part illustrated in FIG. 7.

As illustrated in FIG. 15, eight or more recessed parts 36c may be provided.

Figure 16:
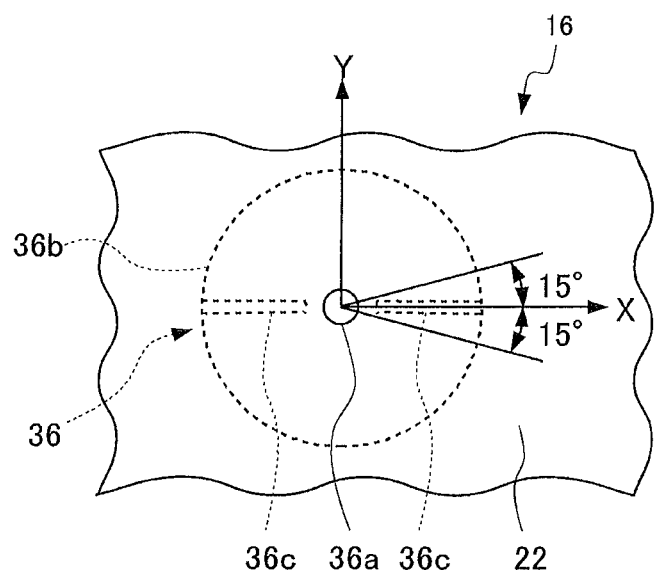
FIG. 16 is a plan view of a relationship between the position of the recessed part and the tire rotating direction.

FIG. 16 describes a relationship between the position of the recessed part 36c and the tire rotating direction.

As illustrated in FIG. 16, the recessed part is preferably provided in a position having axial symmetry when the linking direction of the communicating hole 36 is the axial direction, and is provided within an angle range slanted ±15° with respect to the tire rotating direction.

When the liquid such as the puncture repair agent flows from the outside opening part 36a into the communicating hole 36, the liquid travels along the walls of the communicating hole 36 and moves to a circumferential direction position that is 0° with respect to the tire rotating direction when the tire rotating direction is 0° due to the rotating force of the rotating tire. The liquid is guided to flow into the recessed part 36c more easily while the tire is rotating when the recessed part 36c is provided in the circumferential direction position that is within the angle range slanted ±15° with respect to the tire rotating direction.

The tire information in another embodiment of the present invention may be temperature information of the inside of the tire cavity region in place of the tire pressure information.

While the transmission device and the tire information monitoring system of the present invention have been described in detail up to this point, the present invention is not limited to the above embodiments and it is apparent that a variety of changes and modifications can be made without departing from the scope of the present invention.

What is claimed is:

1. A transmitter apparatus provided inside a tire cavity region enclosed by a tire and a rim, the apparatus comprising:
   a sensor configured to detect a condition of gas filled in the tire cavity region as tire information;
   a transmitter configured to transmit the detected tire information; and
   a housing including a wall that covers the sensor and the transmitter, the housing being provided with an internal space separated from the tire cavity region by the wall and a communicating hole penetrating the wall and connecting the internal space and the tire cavity region;
   the communicating hole being formed such that an inside opening part at a surface of the housing facing the internal space is formed with a wider opening area than an outside opening part at a surface of the housing facing the tire cavity region; and
   a recessed part being provided on a wall surface defining the communicating hole, the recessed part having a concave shape and recessed toward a surface of the housing that includes the outside opening part.

2. The transmitter apparatus according to claim 1, wherein:
   a portion of the recessed part nearest to the surface of the housing including the outside opening part is provided in a position within 2 mm of the outside opening part.

3. The transmitter apparatus according to claim 1, wherein:
   the housing is provided with a flat surface that extends around the outside opening part, and a projecting part that projects no less than 1 mm from the flat surface toward the tire cavity region; and
   the outside opening part is provided at the top of the projecting part.

4. The transmitter apparatus according to claim 1, wherein:
   the recessed part is provided in a plurality of locations in a circumferential region around the communicating hole.

5. The transmitter apparatus according to claim 4, wherein:
   the recessed part has a shape that the recessed part extends in a radial direction centered on the communicating hole and has a width in the circumferential direction no more than 1 mm.

6. A transmitter apparatus provided inside a tire cavity region enclosed by a tire and a rim, the apparatus comprising:
   a sensor configured to detect a condition of gas filled in the tire cavity region as tire information;
   a transmitter configured to transmit the detected tire information; and
   a housing including a wall that covers the sensor and the transmitter, the housing being provided with an internal space separated from the tire cavity region by the wall and a communicating hole penetrating the wall and connecting the internal space and the tire cavity region;
   the communicating hole being formed such that an inside opening part at a surface of the housing facing the internal space is formed with a wider opening area than an outside opening part at a surface of the housing facing the tire cavity region; and
   a recessed part provided on a surface of the wall facing the communicating hole, the recessed part recessed toward a surface of the housing that includes the outside opening part and provided in a plurality of locations in a circumferential region around the communicating hole, the recessed part being in a position having axial symmetry when the linking direction of the communicating hole is the axial direction, and being provided within an angle range slanted ±15° with respect to the tire rotating direction.

7. The transmitter apparatus according to claim 1, wherein:
   a cross-sectional area of the communicating hole in the direction orthogonal to the direction penetrating the wall increases in steps or continuously while proceeding from the outside opening part to the inside opening part.

8. A tire information monitoring system comprising:
   a transmitter apparatus including:
      a sensor configured to detect a condition of gas filled in a tire cavity region encompassed by a tire and a rim, as tire information;
      a transmitter configured to transmit the detected tire information; and
      a housing including a wall that covers the sensor and the transmitter, the housing being provided with an internal space separated from the tire cavity region by the wall and a communicating hole penetrating the wall and connecting the internal space and the tire cavity region, the communicating hole being formed such that an inside opening part at a surface of the housing facing the internal space is formed with a wider opening area than an outside opening part at a surface of the housing facing the tire cavity region, and a recessed part being provided on a wall surface defining the communicating hole, the recessed part having a concave shape and recessed toward a surface of the housing that includes the outside opening part; and
   a monitoring part configured to determine the presence or absence of an abnormality of the tire on the basis of the tire information, and to report the determination results.

9. The transmitter apparatus according to claim 2, wherein:
   the housing is provided with a flat surface that extends around the outside opening part, and a projecting part that projects no less than 1 mm from the flat surface toward the tire cavity region; and
   the outside opening part is provided at the top of the projecting part.

10. The transmitter apparatus according to claim 2, wherein:
    the recessed part is provided in a plurality of locations in a circumferential region around the communicating hole.

11. The transmitter apparatus according to claim 2, wherein:
    a cross-sectional area of the communicating hole in the direction orthogonal to the direction penetrating the wall increases in steps or continuously while proceeding from the outside opening part to the inside opening part.

12. The tire information monitoring system according to claim 8, wherein:
a portion of the recessed part nearest to the surface of the housing including the outside opening part is provided in a position within 2 mm of the outside opening part.

13. The tire information monitoring system according to claim 8, wherein:
the housing is provided with a flat surface that extends around the outside opening part, and a projecting part that projects no less than 1 mm from the flat surface toward the tire cavity region; and
the outside opening part is provided at the top of the projecting part.

14. The tire information monitoring system according to claim 8, wherein:
the recessed part is provided in a plurality of locations in a circumferential region around the communicating hole.

15. The tire information monitoring system according to claim 14, wherein:
the recessed part has a shape that the recessed part extends in a radial direction centered on the communicating hole and has a width in the circumferential direction no more than 1 mm.

16. A tire information monitoring system comprising:
a transmitter apparatus including:
a sensor configured to detect a condition of gas filled in a tire cavity region encompassed by the tire and a rim, as tire information;
a transmitter configured to transmit the detected tire information; and
a housing including a wall that covers the sensor and the transmitter, the housing being provided with an internal space separated from the tire cavity region by the wall and a communicating hole penetrating the wall and connecting the internal space and the tire cavity region, the communicating hole being formed such that an inside opening part at a surface of the housing facing the internal space is formed with a wider opening area than an outside opening part at a surface of the housing facing the tire cavity region, and a recessed part provided on a surface of the wall facing the communicating hole, the recessed part recessed toward a surface of the housing that includes the outside opening part and provided in a plurality of locations in a circumferential region around the communicating hole, the recessed part being in a position having axial symmetry when the linking direction of the communicating hole is the axial direction, and being provided within an angle range slanted ±15° with respect to the tire rotating direction; and
a monitoring part configured to determine the presence or absence of an abnormality of the tire on the basis of the tire information, and to report the determination results.

17. The tire information monitoring system according to claim 8, wherein:
a cross-sectional area of the communicating hole in the direction orthogonal to the direction penetrating the wall increases in steps or continuously while proceeding from the outside opening part to the inside opening part.

18. The tire information monitoring system according to claim 12, wherein:
the housing is provided with a flat surface that extends around the outside opening part, and a projecting part that projects no less than 1 mm from the flat surface toward the tire cavity region; and
the outside opening part is provided at the top of the projecting part.

19. The transmitter apparatus according to claim 9, wherein:
the recessed part is provided in a plurality of locations in a circumferential region around the communicating hole.

20. The transmitter apparatus according to claim 9, wherein:
a cross-sectional area of the communicating hole in the direction orthogonal to the direction penetrating the wall increases in steps or continuously while proceeding from the outside opening part to the inside opening part.

* * * * *